Figures 1, 2:
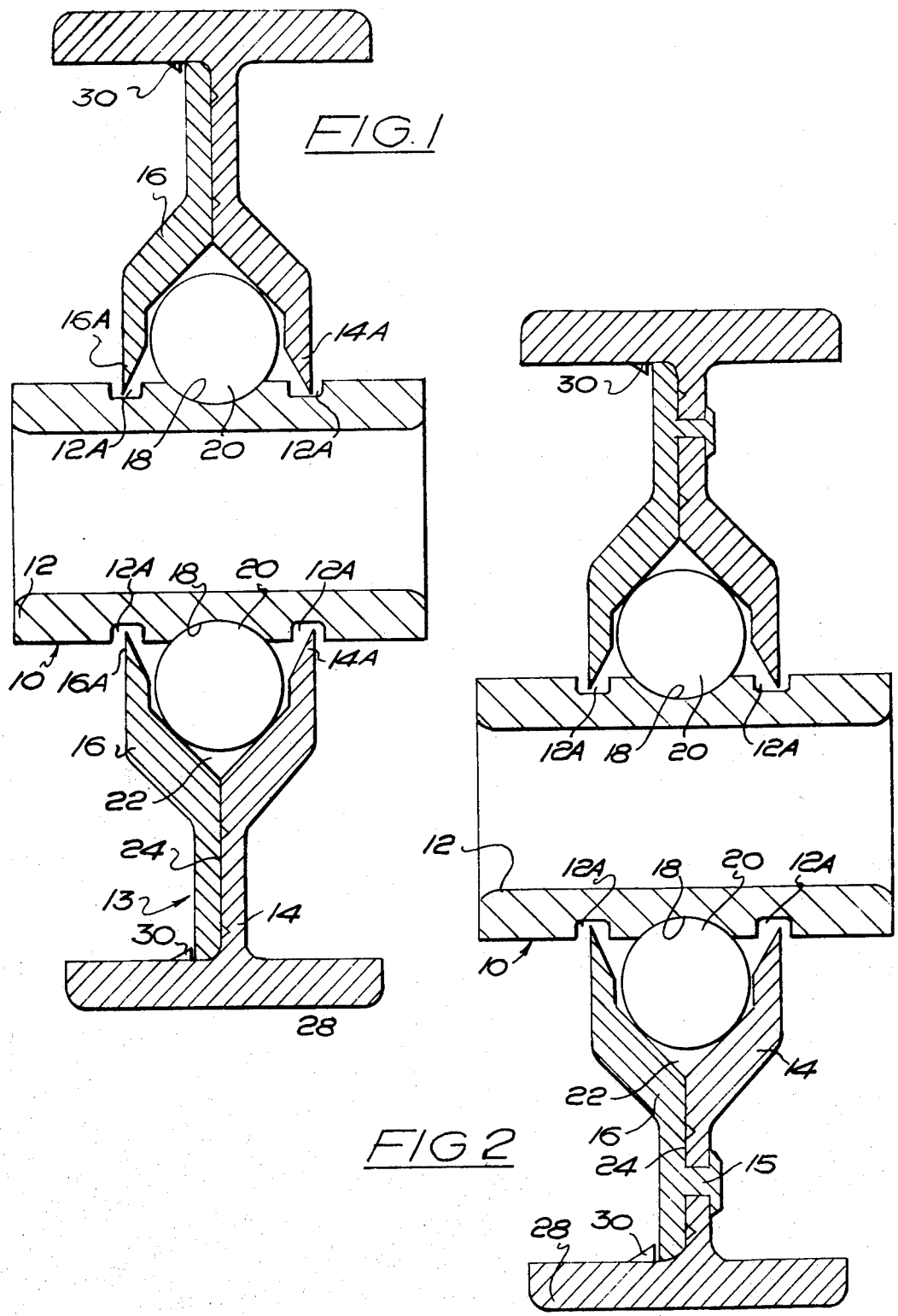

United States Patent [19]
Garnett

[11] 4,048,702
[45] Sept. 20, 1977

[54] BALL BEARINGS

[76] Inventor: David Morris Garnett, Starra Cottage, Great Ouseburn, York, Yorkshire, England

[21] Appl. No.: 674,260
[22] Filed: Apr. 6, 1976
[51] Int. Cl.² .................. B21D 53/10; B21K 1/02
[52] U.S. Cl. .................. 29/148.4 A; 308/189 R; 308/191
[58] Field of Search .............. 308/191, 192, 196; 29/148.4 R, 148.4 A, 148.4 B

[56] References Cited
U.S. PATENT DOCUMENTS

| 2,315,357 | 3/1943 | Smith | 308/196 |
| 3,492,711 | 2/1970 | Fraunberg | 29/148.4 A |
| 3,536,366 | 10/1976 | Nakanishi | 308/191 |
| 3,844,010 | 10/1974 | Frost et al. | 29/148.4 A |

Primary Examiner—Richard A. Bertsch
Attorney, Agent, or Firm—Fred Philpitt

[57] ABSTRACT

A ball bearing is constructed by snap fitting a first section of an outer race to an inner race so that such first section can rotate on the inner race. Balls are operatively positioned in relation to the first section of the outer race and the inner race and a second section of the outer race similarly snap fitted to the inner race so as to be rotatable relative thereto. The first and second sections subsequently are secured together, and this has the effect of firmly positioning the outer race on the balls and clear of the inner race so as to be rotatable freely relative thereto.

5 Claims, 2 Drawing Figures

BALL BEARINGS

The present invention aims to provide a method for constructing ball bearings which will be economical and bearings constructed by the method.

According to the present invention there is provided a method of constructing a ball bearing of which the outer race includes two sections of plastics material which together define a ball retaining cavity, wherein the balls are located so as to rest on the inner race and one section of the outer race, and then the second section of the outer race is positioned to engage the balls and hold same captive and the sections are ultrasonically welded together.

The inner race may be of plastics material and may simply be a bush having an annular ball running groove on the outer periphery thereof.

The plastics material which is used for the bearing components may be any suitable; we have achieved good results with acetal co-polymer resins such as that sold by I.C.I. Limited under the Registered Trade Mark "KEMATOL".

The invention also provides a ball bearing constructed in accordance with the method as aforesaid.

Ultrasonic welding enables an operation which can be carried out readily by means of suitable conventional apparatus, and the use of such welding apparatus and plastics material sections for the outer race enables the bearing to be constructed very quickly, thereby enabling the cost of the bearing to be kept at a minimum.

It is to be appreciated that the sections of the outer race in addition to being ultrasonically welded can also be riveted together.

Whilst the invention can be applied to all ball bearings, we feel that its best application is in relation to bearings for high tolerance low load bearing applications, such as for use as skate wheels or rollers.

When the bearing is to serve as a skate wheel, one of the said sections of outer race may have an integral peripheral flange to serve as the skate wheel supporting surface.

Embodiments of the invention will now be described, by way of example, with reference to the accompanying drawings wherein:

FIG. 1 is a sectional elevation of a ball bearing constructed according to a first embodiment of the invention; and FIG. 2 is a sectional elevation of a ball bearing constructed according to a second embodiment of the invention.

Referring to the drawings and firstly to FIG. 1 it will be seen that the bearing illustrated, which is for use as a skate wheel, comprises an inner race 10 in the form of a bush 12 of plastics material and an outer race 13 which is in two sections 14 and 16 each being of circular form.

The bush 12 is provided with an outer peripheral running groove 18 in which the balls 20 of the bearing run and the balls 20 are held captive in the outer race 12 by means of an annular cavity 22 which is defined jointly by the outer race sections 14 and 16.

The sections 14 and 16 meet at a contact face 24 which lies in a plane which is radial relative to the bearing axis and the said sections 14 and 16 are secured together by means of ultrasonic welding at said contact face 24. The welding may conveniently be carried out by suitable ultrasonic welding apparatus.

As the bearing illustrated is for use as a skate wheel, the section 14 is provided with an outer peripherally extending flange 28 which serves as the supporting surface of the skate wheel, and on the inner surface of such flange 28 there are provided a number of inwardly directed projections 30 which serve for retaining the section 16 in the building up of the bearing. At the inner edge, each of the annular sections 14, 16 is chamfered as shown at 14A, 16A, and these chamfered edges are sprung into grooves 12A in the periphery of bush 12 so that the sections 14, 16 by engaging said grooves and by virtue of projections 30, hold the balls 20 loosely in position prior to the ultrasonic welding.

The sections 16 and 14 at the region of said contact face 24 are cut away between the ultrasonic welds which are affected as spot welds in order to reduce the weight of the bearing and save plastics material.

In building up the bearing illustrated, the inner race 12 and section 14 are located so that section 14 is horizontal and then the balls 20 are positioned so as to engage the peripheral groove 18 and also contact section 14 at the cavity defining region. Next the section 16 is sprung into the position shown over section 14 until it contacts section 14 at face 24. In order correctly to position the section 16 it is necessary that the outer edge of such section should pass the projections 30 and that edge 16A should spring into groove 12A. This is done by forcing the section 16 towards section 14. When the section 16 passes projections 30 and edge 16A engages groove 12A then the bearing is held in a semi-assembled condition preventing the balls 20 from dropping out of the bearing should the bearing for example require to be picked up and transported to another position for the ultrasonic welding. The welding together of the sections 14 and 16 completes the bearing.

The embodiment of the invention illustrated in FIG. 2 of the drawing is very similar in construction to that illustrated in FIG. 1 and parts already described with reference to FIG. 1 and present in the FIG. 2 embodiment are not described but are given the same reference numerals as those used in FIG. 1.

The main difference between the FIG. 2 embodiment in addition to being ultrasonically welded together as in the FIG. 1 embodiment, and the FIG. 1 embodiment is that sections 14 and 16 are also secured together by means of axial rivets 15 on section 16 at said contact face 24 and which rivets 15 pass through section 14. The bearing is assembled as described and the ends of the rivets 15 passing through section 14 are flattened, for example by heating or welding apparatus, to rivet the sections together.

The above principles of construction of bearing can be applied to any ball bearing having an inner race and an outer race but we are of the view that a main application will be for bearings which do not require to be manufactured to a high degree of accuracy and which do not require to carry high loads. Use as a skate wheel is an eminently suitable example of a use of a bearing. Where high accuracy of tolerance is not required the bearings according to the invention can be produced at an extremely high speed thereby enabling the cost thereof to be kept at a minimum.

The balls 20 in the bearing may be of any suitable material such as metal, plastics or glasses.

I claim:

1. A method of constructing a ball bearing device which is composed of an inner race, ball bearings, and an outer race composed of two separate sections of plastics material, which method comprises:

a. snapping a first section of said outer race into a retained operative position around said inner race so that said first section can rotate freely about said inner race, b. disposing said first section of said outer race in a generally horizontal plane and depositing in said horizontally disposed first section a plurality of balls so that said balls engage the race surfaces of said inner race and said first section of said outer race, c. snapping the other outer race section into retained operative position around said inner race so that said other outer race section can rotate freely on said inner race, and thereby trapping said plurality of balls in a cavity jointly defined by said two sections of the outer race, d. securing said two sectins of said outer race firmly together so that said two sections of said outer section are firmly in contact with the balls and free of contact with said inner race.

2. A method according to claim 1 which includes providing the inner race with two retaining grooves into which the inner edges of said two sections are snapped in positioning said two sections in said retained operative positions.

3. A method according to claim 2 wherein each of said grooves is of rectangular cross-section and each of said inner edges of the first and second sections is chamfered to make it more resilient for the snapping-in operation.

4. A method according to claim 2 wherein an outer edge of said other race section is snapped behind retained projections on said first section in moving said second race section to said retained operative position.

5. A method according to claim 1 wherein said two race sections are ultrasonically welded together.

* * * * *